United States Patent

[11] 3,564,237

| [72] | Inventors | Fusanori Takeuchi<br>Kawasaki-shi;<br>Ryoichi Ikematsu, Yokohama-shi;<br>Tomohisa Yamamoto, Tokyo; Syozi<br>Honma, Yokohama-shi; Koji Fukukita,<br>Fukuyama-shi, Japan |
|---|---|---|
| [21] | Appl. No. | 625,384 |
| [22] | Filed | Mar. 23, 1967 |
| [45] | Patented | Feb. 16, 1971 |
| [73] | Assignee | Nippon Kokan Kabushiki Kaisha<br>Tokyo, Japan |
| [32] | Priority | Mar. 31, 1966 |
| [33] | | Japan |
| [31] | | 41/19745 |

[54] INFRARED AUTOMATIC ANALYZING METHOD FOR BLAST FURNACE GAS
1 Claim, 6 Drawing Figs.

[52] U.S. Cl. ................................................. 250/43.5
[51] Int. Cl. ................................................. G01n 21/26
[50] Field of Search ...................................... 250/43.5; 23/232, 254, 255

[56] References Cited

UNITED STATES PATENTS

| 1,299,865 | 4/1919 | Sharp | 23/254E |
| 2,685,649 | 8/1954 | Miller | 250/43.5 |
| 3,162,761 | 12/1964 | Luft | 250/43.5 |
| 2,737,591 | 3/1956 | Wright et al. | 250/43.5 |
| 2,901,626 | 8/1959 | Becker | 250/43.5 |
| 2,957,076 | 10/1960 | Francis | 250/43.5 |
| 3,123,295 | 3/1964 | Martin | 250/43.5 |

*Primary Examiner*—James W. Lawrence
*Assistant Examiner*—C. E. Church
*Attorney*—George B. Oujevolk

ABSTRACT: An automatic controlling method for the operation of blast furnace which comprises maintaining the moisture content of sampled blast furnace gas at an exceedingly low and constant level, keeping the infrared gas analyzers for CO and $CO_2$ in the sample gas at constant temperature, purging, carrying out infrared analysis of the sample gas automatically and continuously under a known atmospheric pressure, correcting automatically the values of the analysis to those at the standard atmospheric pressure, and sending the signals obtained from the corrected values of the analysis to a computer.

INFRARED AUTOMATIC ANALYZING METHOD FOR BLAST FURNACE GAS

BACKGROUND OF THE INVENTION

The present invention relates to an improvement on a process of analyzing the CO and $CO_2$ contents of the blast furnace gas continuously and automatically by means of infrared spectrophotometry.

It is generally well known that in the control of blast furnace operation it is most important in order to estimate the reaction condition within the furnace to know accurately and continuously the composition change of the blast furnace gas, especially that of CO and $CO_2$ percent contained therein. Although the handworking Hempel analyzing method gives reliable values, it would be considerably troublesome to repeat a large number of analyses continuously by this means.

Recently, an infrared analyzing method has been developed for automatic analysis, and such an automatic infrared gas analysis finds increasing uses in continuous determination of the CO and $CO_2$ contents of the blast furnace gas. However, the aforementioned infrared automatic analyzing method has not yet come to the stage of giving reliable date, and at the present time, it still remains only what might be called an ornamental device. Consequently such is the actual state that the analytical values obtained by this infrared method still have to be reconfirmed periodically by the Hempel system. The present infrared automatic analyzing method involves a good deal of uncertainty concerning the accuracy and consistency of analytical measurements.

An object of the present invention in carrying out the infrared analysis of CO and $CO_2$ contents of the blast furnace gas is to slightly modify the infrared gas analyzer now in use and to devise a better process for fully improved accuracy and stability of analysis in order to control easily the blast furnace operation.

Another object of the present invention is to facilitate the stable and continuous control of blast furnace operation by supplying an electronic computer involved in the automatic control system of blast furnace operation with reliable signals issued in proportion to the CO and $CO_2$ contents of the blast furnace gas by the automatic infrared analyzer as a significant input for said automatic control system.

In general, the computing control consists in computations by numerous combinations of complicated mathematical models. In this case, errors in original measurements used as an input for said computer will be noticeably reflected on the values obtained by computation. Therefore it is self-evident that this will eventually have a significant effect on the reliability of the values thus computed. This means that the magnitude of errors in the original measurements are naturally subject to certain limitations, and that the analytical values particularly of CO and $CO_2$ contents having direct and close relations to the reaction conditions in the blast furnace require such exceedingly high accuracy and consistency as are not demanded anywhere else.

The inventors made numerous experiments with the numerical models furnished to the electronic computer first of all concerning the limits, to which should be confined the range of possible errors in the analytical values of CO and $CO_2$ contents. As a result it was ascertained that 0.2 per cent errors in terms of $\sigma$ (standard deviation) were the limit to the indicated analytical values of both CO and $CO_2$ components of the blast furnace gas. In other words, it was discovered that if errors of more than 0.2 percent in terms of $\sigma$ occurred in the indicated analytical values as an input for the computer, there would be significant variations in the values computed, thus resulting in a tendency toward the erroneous control of blast furnace operation.

According to "General Automation of Blast Furnace Operation" by V.A., Sorokin, a publication issued in 1963 by the Soviet Union's national Publisher of Technical Information on Ferrous and Nonferrous Metallurgy, the accuracy of an infrared analyzer required for continuous analysis of the blast furnace gas is given as $\pm 1.65$ percent as a maximum value indicated for CO and $\pm 0.75$ percent for $CO_2$. As described above, however, it would bring about meaningless results to furnish the electronic computer with values of such low level of accuracy.

BRIEF SUMMARY OF THE INVENTION

By using a slightly modified series of blast furnace gas infrared analyzers ornamentally fitted to the blast furnace, the inventors have succeeded in reducing the aforementioned errors constantly to be below 0.2 percent by improving the analytical method concerning the five procedures given below:

1. To maintain the moisture content of continuously sampled gas at an exceedingly low and constant level;
2. To keep the analyzer at constant temperature;
3. To purge off unnecessary sample gas leaked from the analyzers;
4. To carry out infrared analysis of the sample gas at an atmospheric pressure; and
5. To correct the values of the analysis to those at the standard atmospheric pressure.

DRAWINGS

These objects may be attained by the present invention as hereinafter described in detail with reference to the accompanying drawings, in which.

Figure 5:
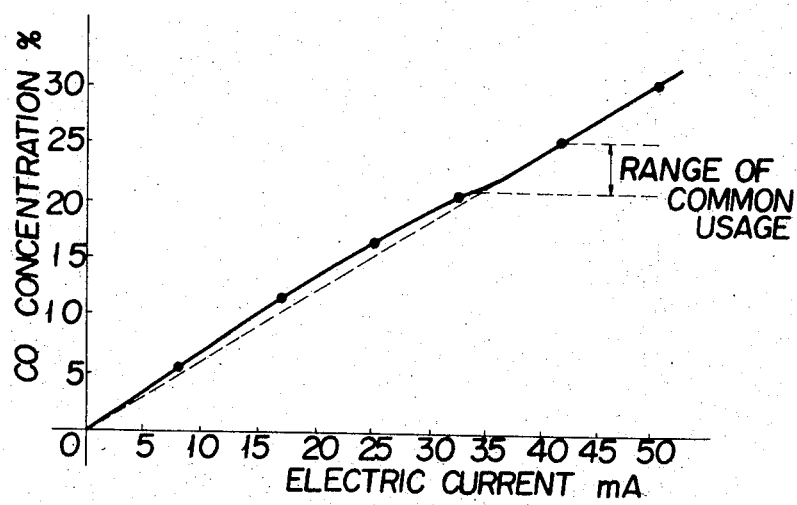
Figure 6:
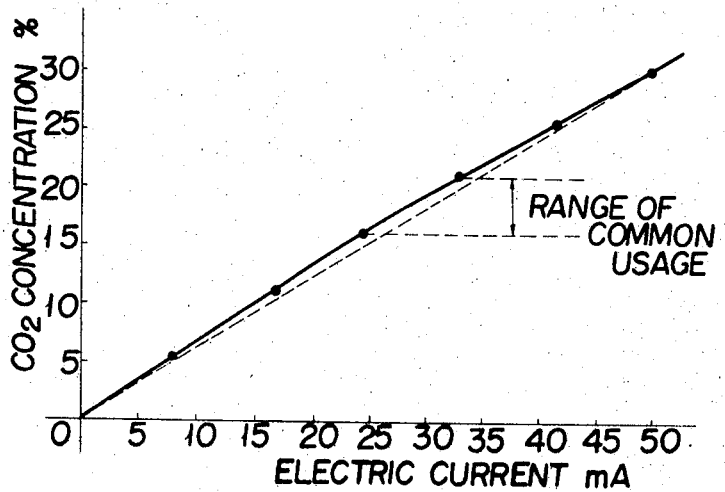

FIGS. 5 and 6 respectively are examples of curve diagram showing the relationship of readings of electric current used in actual analytical measurements versus actual concentrations of the gas components CO and $CO_2$.

A DETAILED DESCRIPTION

Figure 1:
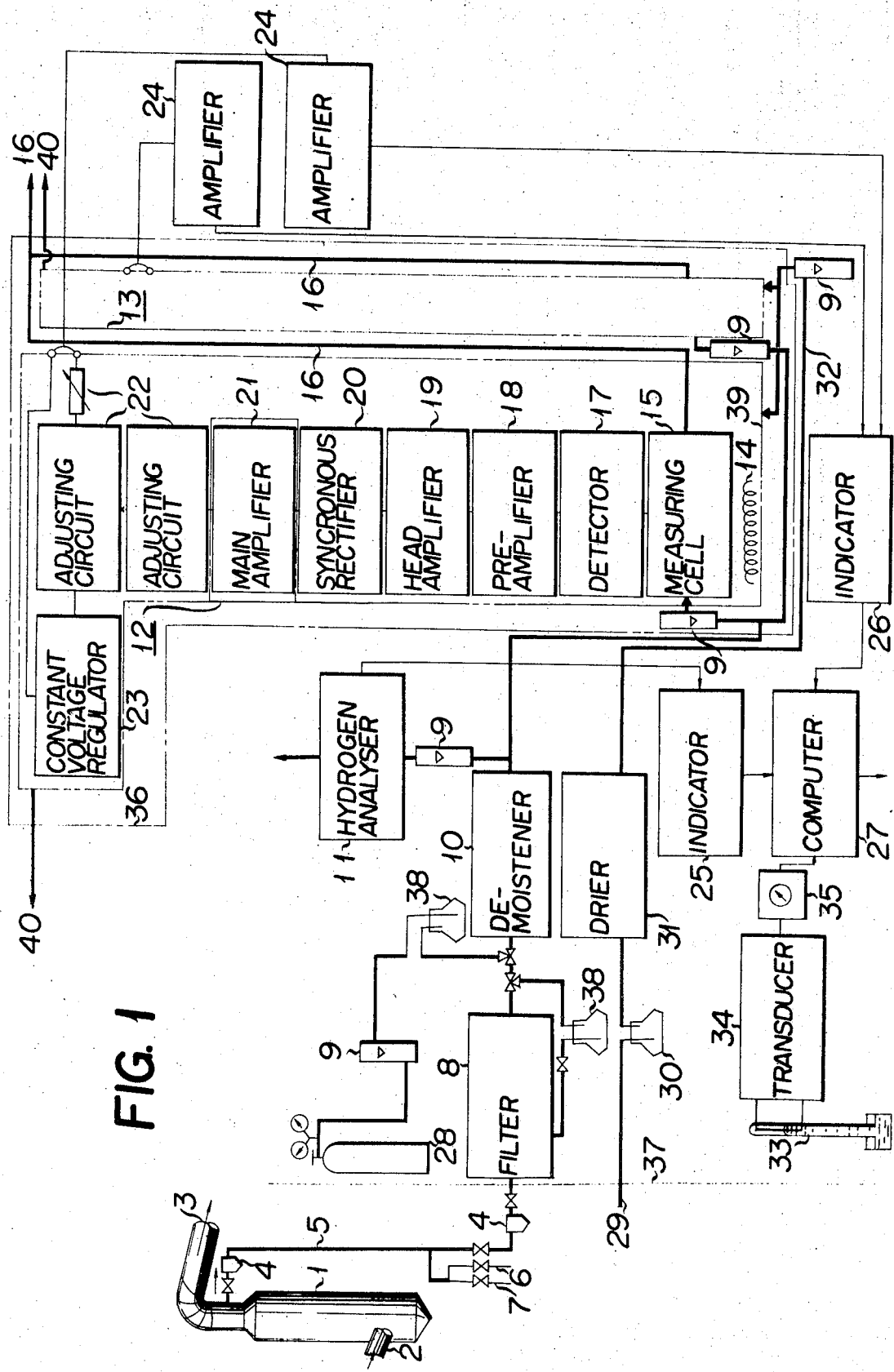
FIG. 1 is a schematic block diagram of the process of the present invention.

Detailed description will hereinafter be given about each of the aforementioned five items in the order mentioned with reference to a schematic block diagram of FIG. 1.

As naturally expected, the blast furnace gas sample to be analyzed should first of all be dedusted and purified. Consequently, as illustrated in FIG. 1, when the blast furnace gas is led into a dust removing tower 1 after an orifice scrubber not shown through main gas pipe 2 connected thereto and released out through main discharge pipe 3, it is advisable to branch out sampling pipe 5 from said main gas discharge pipe 3, instead of branching out a sampling pipe from an assembly pipe for the discharged gas from the blast furnace as has often been practiced in the past. As measured by the inventors, the dust content of the gas at the outlet of the dust removing tower is as small as about 10 $mg/Nm^3$. Moreover, since said gas has as low a temperature as about 38° C and as low a pressure as about 450 mm. water column, the construction of the subsequent series of analyzing equipment will become simple.

The sampling pipe 5 enters into an analysis room 37 through drain vent 4. The gas passing through the sampling pipe 5 is then led into demoistener 10 through filter 8 packed with glass wool after being stripped of small amounts of fine dust still remaining in the gas. It is one of the important characteristics of the process of the present invention to maintain the moisture content of the sampled gas at a reduced and constant level by operating the analytical equipment including the aforementioned demoistener 10. That is to say, the presence of considerable amounts of steam in the sampled gas would cause the spectrophotometrically absorbed wave lengths of the water to overlap on the infrared absorbed wave lengths of the gas components, particularly of CO and $CO_2$, thus resulting in the occurrence of errors on the positive side in the values indicated. According to the experimental research conducted by the inventors, where the moisture content of the sampled gas approximated a saturated state at the time of infrared analysis, the indicated values of CO and $CO_2$ showed errors of over 0.4 percent. Therefore it is necessary to keep the moisture content of the sampled gas as much reduced and constant as possible. Common practice for this purpose is to pass the gas through layers of drying agent such as granular calcium chloride for dehumidification. However, the demoistening power of this type of drying agent is not permanent, though temporarily great. Consequently such drying agent does not offer a constant degree of dehumidification and moreover its replacement is accompanied with complicated handling.

Figure 4:
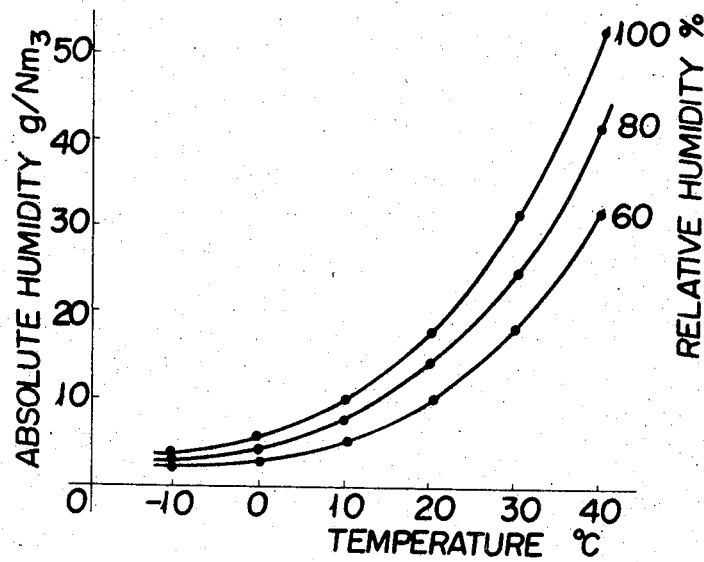
FIG. 4 is a diagram of general curves showing the relationships of temperature relative humidity and absolute humidity.

The process of the present invention uses demoistener 10, where the sampled gas temperature is reduced to about 0.5 to 1° C for dehumidification. However, the temperature is not reduced to 0° C or under in order to prevent the moisture from freezing to the inside wall of the demoistener. The coolant used by the inventors consisted of an ethylene glycol solution having a freezing point of about −20° C. The sampled gas moisture on the inlet side of the demoistener 10 is usually saturated with water vapor at the temperature of the analysis room 37. In winter, however, the open air temperature sometimes falls to below 0° C. In such case, there may be substantially no moisture in the sampled gas. In order to keep the humidity of the sampled gas after the demoistener 10 at a constant level, the sampled gas from the sampling pipe 5 and the filter 8, if the temperature thereof is below 0° C, is passed through a water tank 38 placed in the analysis room 37 at normal temperature, and the gas obtains some moisture from the water contained in the water tank 38. The water therein is in advance saturated by $CO_2$ gas in continuously supplied sampled gas. The gas cooled to about 1° C in demoistener 10 contains only as small amounts as 5 to $6 g/Nm^3$ of saturated moisture as seen from the general humidity curves in FIG. 4.

Nevertheless, it is not advisable to use directly the sampled gas containing small amounts of moisture at the aforesaid temperature of about 1° C, because said moisture content, even though slight, would affect the input for the computing control, of which high accuracy is demanded. For this reason, in the process of the present invention, gas of known composition which may represent the standard composition of the blast furnace gas is separately provided in cylinder 28 for blank tests. The gas is to be led into the demoistener 10 through another tank 38 containing an aqueous solution of $CO_2$ like the aforementioned tank 38. Instead of the sampled gas, the standard gas is led into the analyzer to perform the infrared analysis, and then the analyzer is so adjusted as to accord the indication scale thereof with the known values of the standard gas compositions. When the analytical values of the standard gas is measured in advance by a method of analysis, e.g. Hempel method, the analyzer indicates correct analysis values of the sampled gas in dry state, and the influence of moisture content in the sampled gas from the demoistener 10 to the measured values can be kept off.

The sampled gas from demoistener 10 is then led into the respective analyzers for CO, $CO_2$ and $H_2$. A part of it is introduced into hydrogen analyzer 11, and the values obtained with this analyzer are transmitted to indicator 25, constituting one of the inputs for computer 27. Each of the numerals 9 indicated at several places in the figure represents a gas flow meter respectively. The sampled gas is led into CO analyzer 12 and $CO_2$ analyzer 13 after being regulated to a fixed flow rate by means of the respective meter 9, which have the same interior construction. While the interior construction of analyzer 13 is not shown in the figure, a brief explanation will be hereinafter given of the component units of CO analyzer 12. The numeral 14 represents a source of infrared rays, 15 a measuring cell, 16 a discharge pipe for waste gas from measuring cell 15, 17 a detector, 19 a head amplifier of detected output, 18 a preamplifier and 20 a synchronous rectifier to synchronize for the received signal and the mechanically chopped infrared ray. The output of this is amplified by main amplifier 21 and transmitted to a constant voltage regulator 23 as a direct current through adjusting circuits 22 including a balancing motor in accordance with the magnitude of outputs from the main amplifier 21.

The process of the present invention has adopted following two characteristic methods for the aforementioned CO analyzer 12 and $CO_2$ analyzer 13. One of said methods is to hold both analyzers in a single thermostat 36 so as to keep the temperature of the entire apparatus at a constant level. Many experiments by the inventors indicated that each of the aforesaid analyzers was easily affected by variations in temperature, directly resulting in errors of indicated values. Namely, these errors were deemed due to a combined effect of changes in the molecular density of the sampled gas arising from its different temperatures and variations in measured values resulting from the different temperatures of each analyzer itself. As actually measured, variations of 0.1 percent occurred in the analysis of CO content per temperature change of 1.0° C and of 0.25 percent in $CO_2$. These errors can be eliminated completely by the use of the aforementioned thermostat. It is not necessary to limit the temperature of the thermostat to any specific point and it will be sufficient if said temperature is set at a proper level in consideration of the prevailing atmospheric conditions and maintained at that level.

A second characteristic method consists in providing a separate space 39 in the thermostat 36 to contain all circuits excepting that of main amplifier 21, and in introducing fresh air 29 into this separate space from outside of the analysis room by a pipe 32 through $CO_2$ absorber 30 and drier 31 so as to purge off through exhaust pipe 40 the sample gas which has leaked into said space. With analyzers in general, it is considerably difficult completely to prevent gas leaks, and it is true that gases tend to escape from the joints or packing sections of a sample gas pipe for analysis. Infrared ray source 14 and measuring cell 15 are not closely attached to each other, but are usually arranged substantially apart by the presence of an infrared reflector or other attachments. Therefore, appreciable amounts of the infrared rays from the source will be absorbed in the leaked gas, if present, while traveling to measuring cell 15. Thus it is an important factor in assuring the accuracy of analysis to purge off the leaked gas at all times. The temperature of air led into the separate space 39 for removal of leaked gas is preferred to be the same as that of the thermostat 36. Specifically the pipe 32 is inserted into the space 39 after traveling a long way in the thermostat 36. It was experimentally ascertained that an optimum flow rate of air to be led was 5 liters per minute.

The last of the previously described five important procedures involved in the process of the present invention is to keep the gas pressure within the measuring cell 15 at atmospheric pressure. Generally with the conventional infrared gas analyzer, it is deemed necessary to keep the sampled gas flow rate constant, and also to fix the pressure of said gas at about 30 mm. water column. (Refer to the Soviet Union literature as previously mentioned.) However, such conventional gas pressure control not only complicates the apparatus used but also presents difficulties in eliminating time lags required to restore appropriate pressures by the action of pressure control device, regardless of how accurate the unit is installed. The inventors found that this was one of the causes which made it difficult to obtain high accuracy and consistency of the indicated analytical values. Therefore in the process of the present invention it is given up to attach such pressure control device to the measuring cell 15, and the gases within this cell are always allowed to be released under atmospheric pressure. Actually it is only required to release the gases within the measuring cell 15 to outside of the thermostat 36 through the gas discharge pipe 16 of a large diameter. It was experimentally ascertained that if the diameter of gas discharge pipe 16 was 1.5 to 2 times greater than that of the pipe conducting gases to measuring cell 15, the pressure within said cell would be maintained at an atmospheric level. Such device has completely eliminated the time lags encountered where a pressure control device was used, and enabled accurate analysis to be made under stable conditions. Nevertheless, the atmospheric pressure is not always fixed, but is more or less subjected to slight variations. In consideration of this fact, it is required to make corrections accordingly, and such corrections can be made easily and accurately. To explain with reference to FIG. 1 the amount values of gas components including CO and $CO_2$ measured at atmospheric pressure are given forth from the respective analyzers in the form of direct current. Since these outputs are as weak as about 100 microamperes, they are amplified to 0 to 50 milliamperes by amplifier 24 to be read on indicator 26, and then furnished to computer 27. On the other hand, the atmospheric pressure measured by barometer 33 is converted to electric current by transducer 34, and the current is properly amplified by an amplifier contained in transducer 34 to be read on indicator 35, and then furnished to computer 27, This input is compared with values at a pressure of 760 mm. Hg. according to the program previously incorporated in said computer so as to correct the aforementioned analyzer output. Correction is made by the following formula:

$$A = B \times \frac{760 \text{ mm. Hg.}}{P}$$

Where
$A$ = corrected or true values of gas content.
$B$ = percent analyzer output
$P$ = mm. Hg. measured atmospheric pressure In this case, both $B$ and $P$ are converted to digital values by an ordinary $A-D$ transducer in the computer. For output B, it is necessary to make current corrections. This follows because that relations between output current and percent of content values do not vary linearly. While there are, of course, appreciable differences in these relations according to the analyzer design, the inventors found experimentally that these differences were not of negligible magnitude at all. When the analytical values are to be read on indicator 25 in FIG. 1, it is easy to adjust the span to the current vs. content value curves. The analyzers used by the inventors showed characteristic tendencies for deviations of CO and $CO_2$ content value in accordance with the change of electric current from the analyzer as illustrated by solid lines in FIGS. 5 and 6.

With thy curves given in FIGS. 5 and 6, the inventors selected a range of normal usage as shown therein, and obtained the following equations.

In case of CO, $$Y = \frac{3}{20} X \quad (1)$$

$$Z = \frac{15.1}{14} y - 1.9 \quad (2)$$

or $$Z = Y \quad (3)$$

Where:
$X$ = digital values obtained when currents of 0 to 50 milliamperes are converted to nameless numbers of 0 to 2,000
$Y$ = approximate gas concentrations of 0 to 30 percent; and
$Z$ = per cent of true gas concentration as corrected Since, in this case, curves are not uniform as illustrated in FIG. 5, equation (2) is used when the value of equation (1) is less than 23.5 percent, and equation (3) when said value is over 23.5 percent.

In case of $CO_2$.

$$Z = \frac{18}{17} y - 1.6 \quad (4)$$

or $$Z = y - 0.12 \quad (5)$$

When the value of equation (1) is less than 20.0 percent equation (4) is used, and when said value is over 20.0 percent, equation (5) is used.

Figure 2:
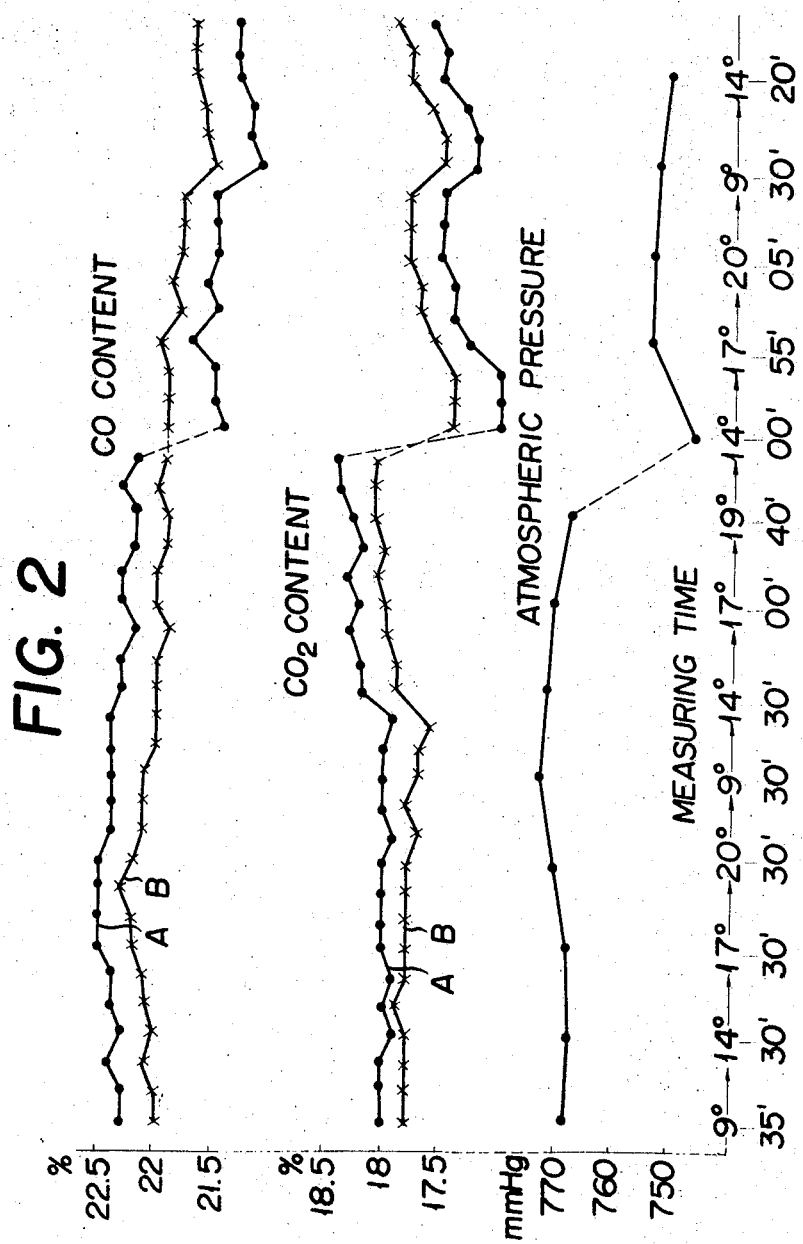
FIG. 2 is an example of analytical records when analysis was carried out according to the method of the present invention.
Figure 3:
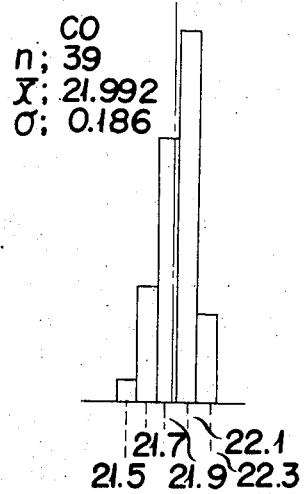
FIG. 3 is a histogram of the analytical values of FIG. 2.
Figure 3:
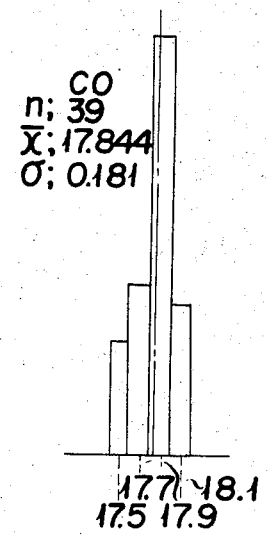

FIG. 2 represents linear presentations of the results of gas analysis carried out continually according to a series of time lapses in one embodiment of the process of the present invention. Line A represents actually measured values and line B values corrected on the basis of atmospheric pressure. FIG. 3 is a histogram obtained by analyzing the values of FIG. 2, showing that the accuracy of analysis was 0.18 percent in terms of $\sigma$. Reverting to FIG. 1, 6 and 7 are the inlets of air and steam respectively used in cleaning the gas system, which have been customarily installed hitherto.

The factors as detailed above regarding each of the aforementioned five procedures are all indispensable to the process of the present invention. Absence of any of these procedures would make it difficult to control automatically the reaction within a blast furnace by using a computer.

As explained above, the process of the present invention has succeeded in obtaining far more accurate analysis of the blast furnace gas than has been known in the past simply by slight modifications of the presently used infrared analyzer and by improving the method of handling the equipment. The vital significance of the present invention lies in the fact that the automatic control of blast furnace reactions by the use of an electronic computer has now been demonstrated.

We claim:

1. A method of automatically and continuously measuring the amount of CO and $CO_2$ in a blast furnace exhaust gas, by means of infrared gas analyzers for the purpose of automatically controlling the operation of the blast furnace by means of an electronic computer, which comprises:
   1. continuously sampling the exhaust gas;
   2. removing dust and other solid particles from the gas sample to produce a clean gas sample;
   3. cooling the clean gas sample to a temperature of about 1° C in order to lower the moisture content of said sample to an amount which is substantially uniform in the resulting cooled, dried sample;
   4. introducing the cooled, dried sample into infrared gas analyzers maintained at constant temperature and atmospheric pressure;
   5. measuring the amounts of CO and $CO_2$ in said sample, to obtain a measurement signal;
   6. passing purified air as a purge gas in the volume surrounding the apparatus while performing said measurement in order to insure the removal of extraneous CO and $CO_2$ from said apparatus while said measurements are being performed automatically and continuously;
   7. obtaining a signal representing the actual pressure of the gas sample being measured;
   8. correcting the measurement signals obtained above, to compensate for the difference between the actual gas sample pressure and a standard pressure; and
   9. sending the corrected measurement signals for the CO and $CO_2$ contents of said gas to an electronic computer so as to control the operation of the blast furnace.